Patented Oct. 20, 1936

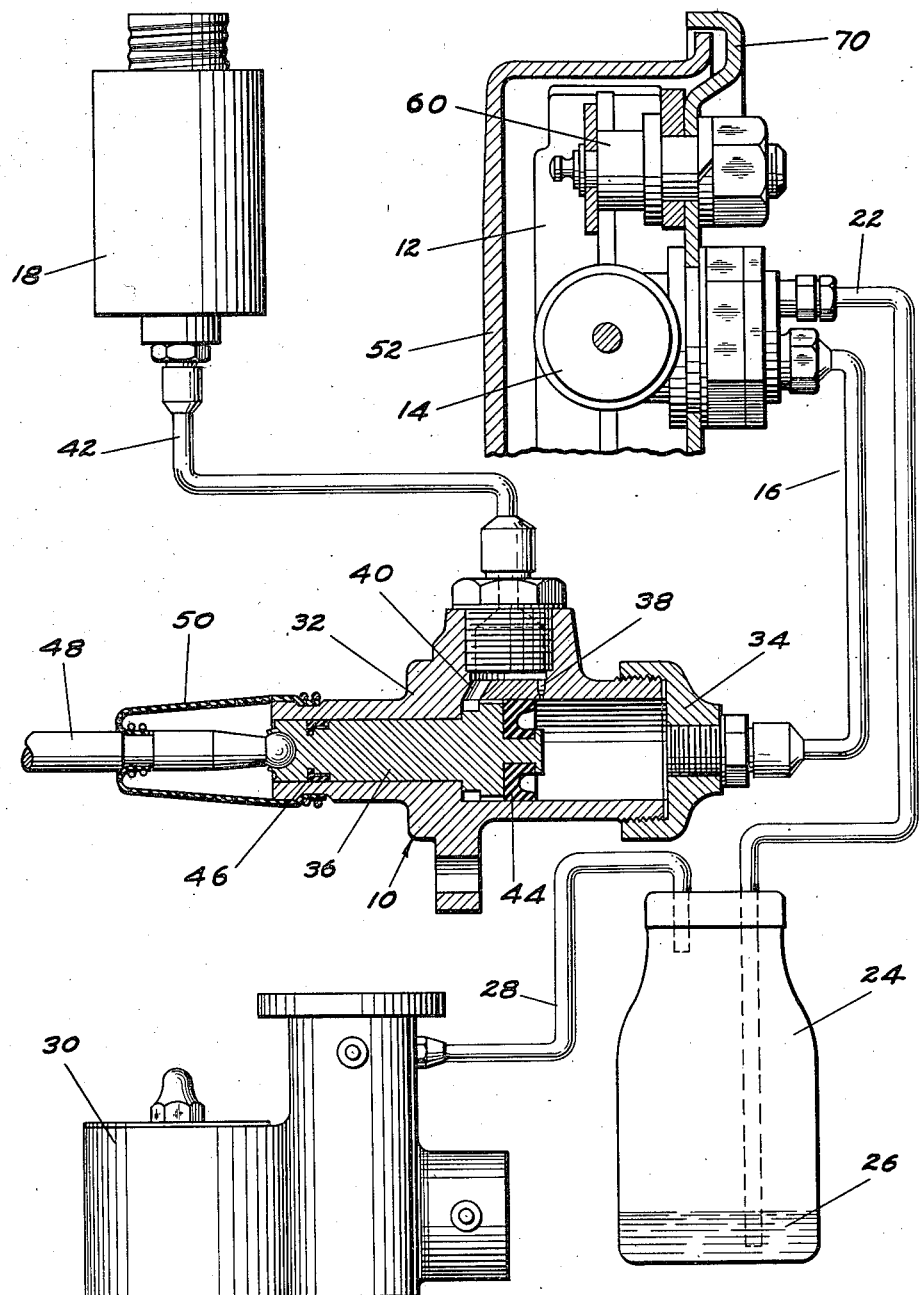

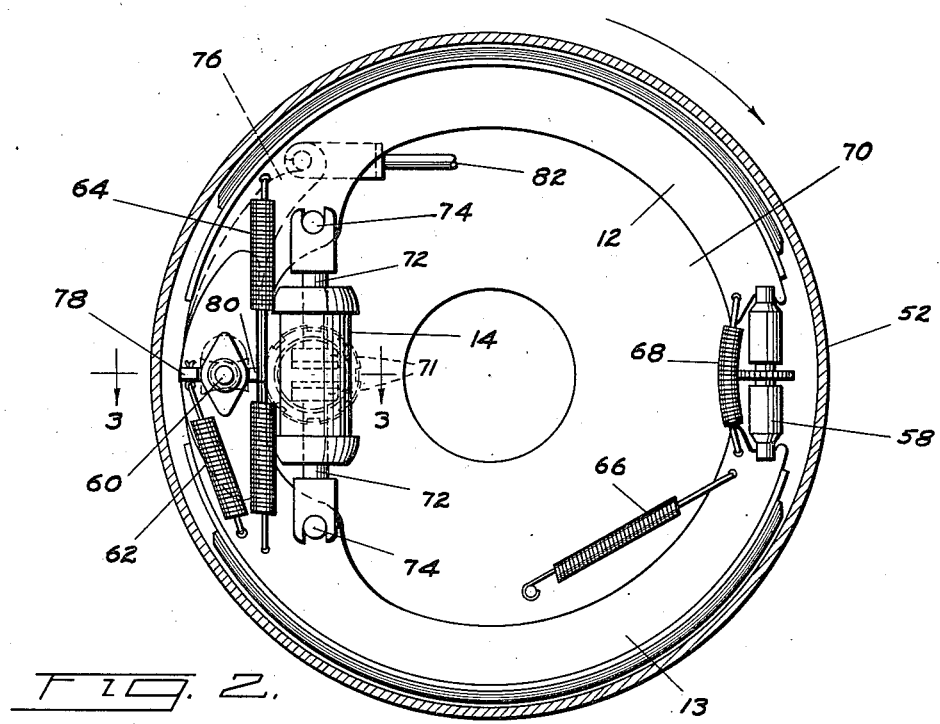
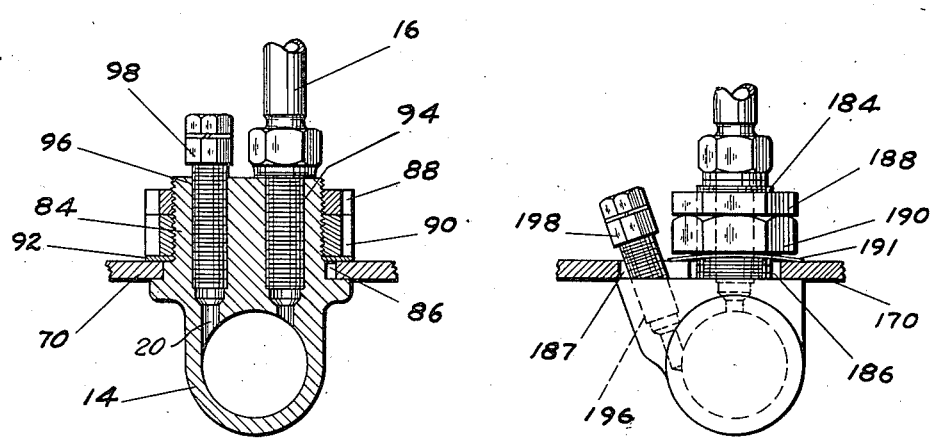
INVENTOR.
LUDGER E. LaBRIE
BY Jerome R. Cox
ATTORNEY.

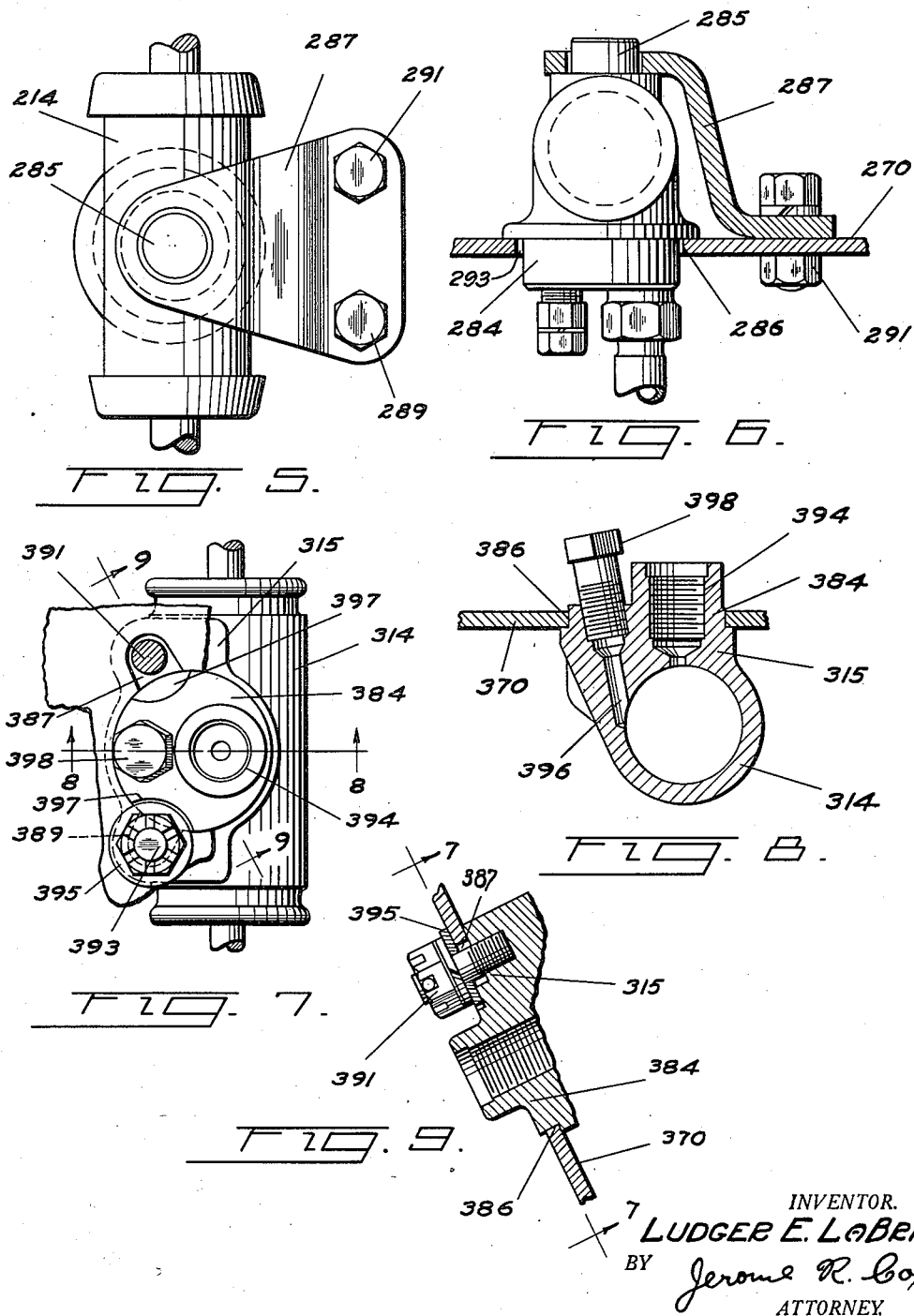

2,057,723

UNITED STATES PATENT OFFICE 2,057,723

BRAKE

Ludger E. La Brie, South Bend, Ind., assignor to Bendix Aviation Corporation, South Bend, Ind., a corporation of Delaware Application February 24, 1933, Serial No. 658,417

1 Claim. (Cl. 188—152)

This invention relates to automotive brakes and especially to hydraulic systems for operating said brakes and to methods of operating such systems.

One of the objects of this invention is to improve the methods of "bleeding" the air from the hydraulic cylinders and the associated conduits.

A further object of the invention is to improve the methods of and the means for attaching the wheel cylinders to the backing plates so as to increase the adjustability thereof, to allow greater tolerances in manufacturing, to increase the ease of assembly, and to allow the cylinders to move to accommodate themselves to the swing of the shoes.

One of the features of my invention therefore is the arrangement of a wheel cylinder so that it is not rigidly secured to the backing plate but is pivoted thereon and clamped against excessive movement solely by friction.

A further feature of my invention is the special arrangement of the parts of the braking system of the automotive vehicle for "bleeding". The structure disclosed includes conduit connections from the vehicle motor air intake system to the wheel cylinders whereby air is withdrawn from the braking system by vacuum.

Further objects and features of the invention will be apparent after a reading of the accompanying specification and claims and after consideration of the accompanying drawings in which:

Figure 1 is a more or less diagrammatic view of a braking system constructed according to my invention and connected up as in the bleeding operation, parts of the system being shown in section;

Figure 2 is a transverse vertical section of the wheel brake shown in Figure 1;

Figure 3 is a sectional view of the wheel cylinder;

Figure 4 is a view similar to Figure 3 showing a modified form of mounting for the wheel cylinder;

Figure 5 is a view in side elevation of another modified form of mounting for the wheel cylinder;

Figure 6 is a view in section of the mounting shown in Figure 5;

Figure 7 is a view in side elevation of still another modified form of mounting;

Figure 8 is a view in section of the wheel cylinder shown in Figure 7; and

Figure 9 is another view in section of the wheel cylinder shown in Figure 7.

Referring particularly to Figures 1, 2, and 3 of the drawings in which is illustrated a brake embodying my invention, there is shown a master cylinder 10 adapted to actuate the brake shoes 12 and 13 by means of a wheel cylinder 14 which is connected to the master cylinder by a conduit 16. The cylinders 10 and 14 and the conduit 16 are normally maintained full of liquid which is supplied from a supply reservoir 18.

When the system is first to be filled with liquid and possibly periodically thereafter it is necessary that all air in the system be eliminated. To this end I provide in the cylinder 14 a bleeder opening 20 to which, during the bleeding operation, there is attached a conduit 22 leading to the lower part of a container 24. The conduit 22 has its container end submerged below the surface of a quantity of liquid 26 within said container. Leading from the upper part of the container (above the surface of said liquid) is another conduit 28 which has its opposite end connected with a portion of the air intake system of the motor of the vehicle. The conduit is shown as connected directly to the carburetor 30 although it is clear that it could be connected to other parts of the air intake system.

The master cylinder 10 comprises essentially a hollow casting 32, a forward cap 34 to which the conduit 16 is attached, and a piston 36. The casting is provided with openings 38 and 40 which are connected through conduit 42 with supply reservoir 18. The piston is provided with resilient sealing cups 44 and 46, the latter being L-shaped in cross section. To the rear end of the piston 36 is attached a piston rod 48 which is connected to a foot pedal or other operating member. The rear end of the cylinder is provided with a flexible boot 50 for preventing the entrance of dust, etc.

The braking structure at the wheel is shown clearly in Figure 2. Within the rotating drum 52 there are provided a pair of brake shoes 12 and 13 pivotally and adjustably connected by a link 58. The shoes 12 and 13 are adapted to anchor on the free end of one of said shoes in forward braking and the free end of the other shoe in rearward braking bearing respectively upon an anchor pin 60. The shoes are normally held out of contact with the drum by springs such as 62, 64, 66 and 68, the spring 66 being attached to the backing plate 70.

The cylinder 14 is provided with a pair of pistons 71 each having a piston link 72. Each of the links 72 acts on a pin 74 secured to one or the other of the shoes 12 and 13. Thus pressure in the liquid in the braking system spreads the wheel cylinder pistons and through the links 72 spreads the shoes into contact with the drum.

An auxiliary applying means is provided. It comprises a lever 76 provided with lugs 78 and 80. The lever 76 is loosely mounted to surround the anchor pin 60 and is operated through an operating link 82 by any suitable operating means. When the lever 76 is rotated the lugs 78 and 80 act to spread the shoes into contact with the drum.

The casting which forms the cylinder 14 is formed with a threaded cylindrical projection 84 which extends through an oversize circular opening 86 formed in the backing plate 70. The cylinder is secured non-rigidly to the backing plate 70 by nuts 88 and 90 threaded onto the projection, a washer 92 being interposed between the nut 90 and the backing plate 70. Because of the type of mounting, the cylinder may be easily adjusted to its best position, the tolerances allowable may be increased, and the assembly of the structure may be simplified.

The projection 84 is formed with a bore 94 which forms the main supply opening to which the conduit 16 is connected and with a bore 96 which forms the bleeder opening 20 and through which air is withdrawn from the system in bleeding. These bores both extend into the main chamber of the cylinder, the bleed bore 96 being normally closed by a threaded plug 98.

In the embodiment shown in Figure 4, the bore 196 is inclined relative to the projection 184 and the opening 186 is extended at one side by a slot 187 to accommodate a plug 198 threaded in the bore 196. Interposed between the nuts 188 and 190 and the backing plate 170 is a spring plate 191 which overlaps the sides of the slot 187.

In the embodiment shown in Figures 5 and 6 the cylinder 214 is formed with a circular projection 284 extending through an opening 286 in the backing plate 270 and with a smaller oppositely extending circular projection 285. A bracket 287 fastened to the backing plate 270 by bolts 289 and 291 has an opening 293 through which the projection 285 loosely extends.

In the embodiment shown in Figures 7, 8, and 9 the cylinder 314 is formed with a solid portion 315 and superposed thereon has a substantially circular projection 384. The latter extends through a substantially circular opening 386 in the backing plate 370, the opening 386 being provided with slots 387 and 389. Bolts 391 and 393 extend through the slots 387 and 389 and are threaded into the solid portion 315. Washers 395 are positioned to bear on the backing plate 370 and on semicircular depressions 397 in the projection 384, being urged into contact therewith by the heads of bolts 391 and 393. It may be seen that the cylinder may rotate in the opening 386 except as restrained by the bolts 391 and 393 in their movement within slots 387 and 389. Neither bore 394 nor 396 is concentric with projection 384, the latter being inclined to the backing plate. A plug 398 normally seals bore 396.

It is to be understood that the above described embodiments of my invention are for the purpose of illustration only and various changes may be made therein without departing from the spirit and scope of the invention.

I claim:
In a hydraulic brake system a backing plate having a relatively large circular opening and a plurality of relatively small slots connected with said opening, a wheel cylinder formed with a substantially cylindrical projection extending into said large opening, the projection being rotatable in said opening and means comprising bolts extending loosely through said smaller slots for frictionally clamping said cylinder to said plate for preventing excessive movement thereof.

LUDGER E. LA BRIE.